(12) United States Patent
Copley et al.

(10) Patent No.: US 9,066,121 B2
(45) Date of Patent: Jun. 23, 2015

(54) ADDRESSABLE ADVERTISING SWITCH BY DECOUPLING DECODING FROM SERVICE ACQUISITIONS

(75) Inventors: Brian J. Copley, Mansfield, MA (US); Jeremy J. Mazzariello, Pelham, NH (US)

(73) Assignee: Google Technology Holdings LLC, Mountain View, CA (US)

( * ) Notice: Subject to any disclaimer, the term of this patent is extended or adjusted under 35 U.S.C. 154(b) by 251 days.

(21) Appl. No.: 13/205,681

(22) Filed: Aug. 9, 2011

(65) Prior Publication Data
US 2013/0042265 A1 Feb. 14, 2013

(51) Int. Cl.
*H04N 21/2668* (2011.01)
*H04N 21/43* (2011.01)
*H04N 21/44* (2011.01)
*H04N 21/458* (2011.01)
*H04N 21/81* (2011.01)

(52) U.S. Cl.
CPC ....... *H04N 21/2668* (2013.01); *H04N 21/4302* (2013.01); *H04N 21/44016* (2013.01); *H04N 21/458* (2013.01); *H04N 21/812* (2013.01)

(58) Field of Classification Search
CPC ................................................. H04N 21/4302
USPC ...................................................... 725/32-35
See application file for complete search history.

(56) References Cited

U.S. PATENT DOCUMENTS

| 6,298,088 | B1 | 10/2001 | Bhatt et al. |
| 7,100,183 | B2* | 8/2006 | Kunkel et al. ................... 725/34 |
| 2008/0256589 | A1* | 10/2008 | Osaki ............................ 725/131 |

OTHER PUBLICATIONS

Society of Cable Telecommunications Engineers, Inc., ANSI/SCTE 138 2009, Stream Conditioning for Switching of Addressable Content in Digital Television Receivers, 2009, http://www.scte.org/documents/pdf/Standards/ANSI_SCTE%20138%202009.pdf (23 pages).

* cited by examiner

*Primary Examiner* — Olugbenga Idowu
(74) *Attorney, Agent, or Firm* — Byrne Poh LLP

(57) ABSTRACT

A method and computing device for switching from a first transport stream to a second transport stream. The method detects a trigger in the first transport stream that determines a switch point for tuning to the second transport stream. The method receives a last frame of audio/video content in the first transport stream that immediately precedes the switch point, and initiates a switch to the second transport stream after receiving the last frame. The method processes the last frame through an audio/video decoder simultaneous with the initiating of the switch, and disables the output of the audio/video decoder after the processing of the last frame. The method receives a first frame of audio/video content in the second transport stream, and enables the output of the audio/video decoder after processing the first frame through the audio/video decoder.

19 Claims, 5 Drawing Sheets

ADDRESSABLE ADVERTISING SWITCH BY DECOUPLING DECODING FROM SERVICE ACQUISITIONS

BACKGROUND

In a digital video broadcast system, a headend component uses Quadrature Amplitude Modulator (QAM) devices or Internet Protocol (IP) services to deliver audio/video (AV) content to a set-top box as a Moving Pictures Expert Group (MPEG) stream. The MPEG stream may include "live" advertisements or targeted advertisements. The targeted advertisements are placed in a parallel QAM or an IP service that is synchronized with the "live" advertisements. Alternatively, the targeted advertisements may be stored on a data storage device that is either integrated with the set-top box, or accessible via a network communication connection. Software on the set-top box that includes a digital video recorder (DVR) determines whether to perform a switch to the targeted advertisement based on various traits, such as demographics, purchase history, observed behavior, or the like.

Multiple System Operator (MSO) customers are developing and deploying targeted advertising systems. These systems enable a set-top box to switch from a network service to an addressable advertising service, and back to the network service during an advertising break. The term "switch" includes the definition of "switch" in the context of the American National Standard (ANSI) Society of Cable Telecommunications Engineers (SCTE) Standard ANSI/SCTE 138 (i.e., switch describes tunes (L0 switch) and splices (L1 switch)), the definition of "tune" in the context of a QAM device, and the definition of "switch" or "transition" in the context of an IP or DVR device. In the first phase of deployment, the delivery of the network service and addressable advertising services are on separate transport streams, in which the addressable advertising content is synchronized with an advertisement on the network service. Since multiple advertisement streams are simultaneously delivered to the set-top box, the set-top box selects one of the advertisements, based on received information and locally stored selection criteria, and switches at the appropriate time.

The addressable advertisements contain filler, as defined in ANSI/SCTE 138. The filler follows signaled switch points which mark an opportunity to switch from the network service to the addressable advertising service, and an opportunity to switch from the addressable advertising service back to the network service. The filler is properly formatted frames that represent black pictures and silent audio, and that optimize the service acquisition procedure by allowing the set-top box the time necessary to switch to and begin decoding the new service. The duration of the filler is selected to allow for the time needed for the slowest set-top box in the network to switch to and begin decoding the new service. Since the duration of the filler is lost on the switch to the addressable advertising service and on the switch back to the network service, the duration of the filler takes away from the duration of the addressable advertising content. There is a need to minimize the duration of the filler and maximize the duration for the addressable advertising content. The presently disclosed invention satisfies this demand.

SUMMARY

Aspects of the present invention provide a method and computing device for switching from a first transport stream to a second transport stream. The method detects a trigger in the first transport stream that determines a switch point for tuning to the second transport stream. The method receives a last frame of audio/video content in the first transport stream that immediately precedes the switch point, and initiates a switch to the second transport stream after receiving the last frame. The method processes the last frame through an audio/video decoder simultaneous with the initiating of the switch, and disables the output of the audio/video decoder after the processing of the last frame. The method receives a first frame of audio/video content in the second transport stream, and enables the output of the audio/video decoder after processing the first frame through the audio/video decoder.

DETAILED DESCRIPTION

Figure 1:
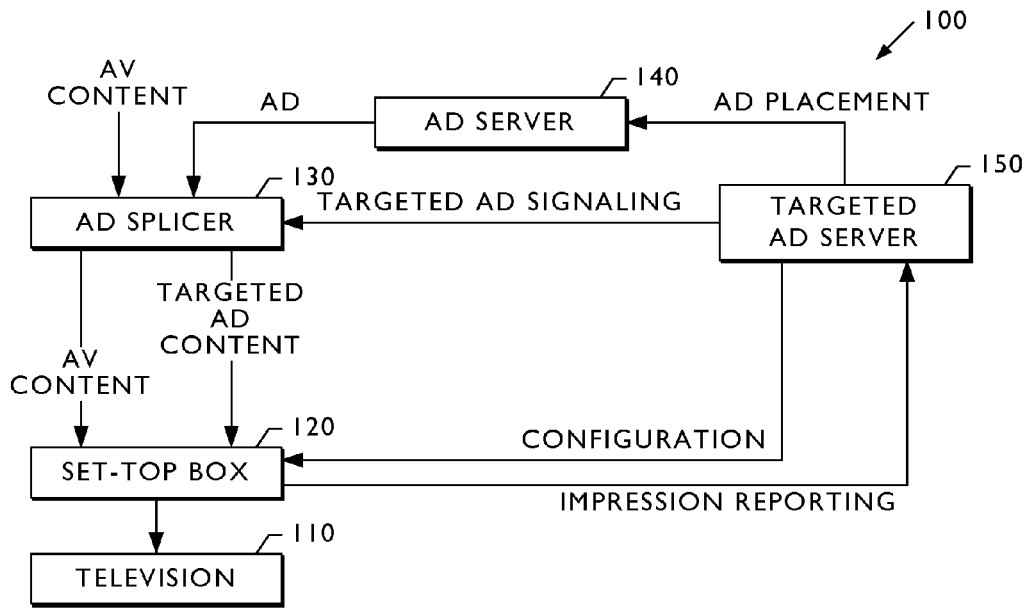
FIG. 1 is a block diagram that illustrates one embodiment of the hardware components of a system that performs the present invention.

FIG. 1 is a block diagram that illustrates one embodiment of the hardware components of a system that performs the present invention. A targeted advertising system 100 includes a television 110, set-top box 120, advertisement (Ad) splicer 130, advertisement (Ad) server 140, and targeted advertisement (Ad) server 150. In one embodiment, a network (not shown), such as a hybrid-fiber coaxial (HFC) network, connects the set-top box 120 and the television 110 to the Ad splicer 130, Ad server 140, and targeted Ad server 150.

The Ad splicer 130 is a computing device that receives audio/video (AV) content from an external signal source, Ad content from the Ad server 140, and targeted Ad signaling from the targeted Ad server 150. The AV content includes primary channels with SCTE 35, such as network programs and network advertisements. In one embodiment, the Ad content is a replacement for the primary network advertisement that is typically shown during a network program or between two network programs. The Ad splicer 130 synchronizes the Ad content and targeted Ad signaling with the network advertisements in the AV content, and delivers the resulting AV content stream and targeted Ad content to the set-top box 120.

The Ad server 140 is a computing device that receives Ad placement from the targeted Ad server 150 and provides the Ad content to the Ad splicer 130. In another embodiment, the Ad server 140 provides the Ad content as preloaded Ads to the set-top box 120.

The targeted Ad server 150 is a computing device that determines Ad placement in the AV content based on targeted Ad selection criteria. The targeted Ad server 150 sends the Ad placement to the Ad server 140, and targeted Ad signaling to the Ad splicer 130. The targeted Ad server 150 also configures the set-top box 120, and receives impression reporting from the set-top box 120 following playback of the targeted AV content.

The set-top box 120 is a computing device that connects the television 110, Ad splicer 130, Ad server 140, and targeted Ad server 150. In one embodiment, the set-top box 120 is a digital video recorder (DVR) that a subscriber (not shown) operates to request a digital video stream from the Ad splicer 130, and stores it for viewing at another time on the television 110. The digital video stream includes the AV content and targeted Ad content. In another embodiment, the set-top box 120 receives the Ad content as preloaded Ad content from the Ad server 140.

Figure 2:
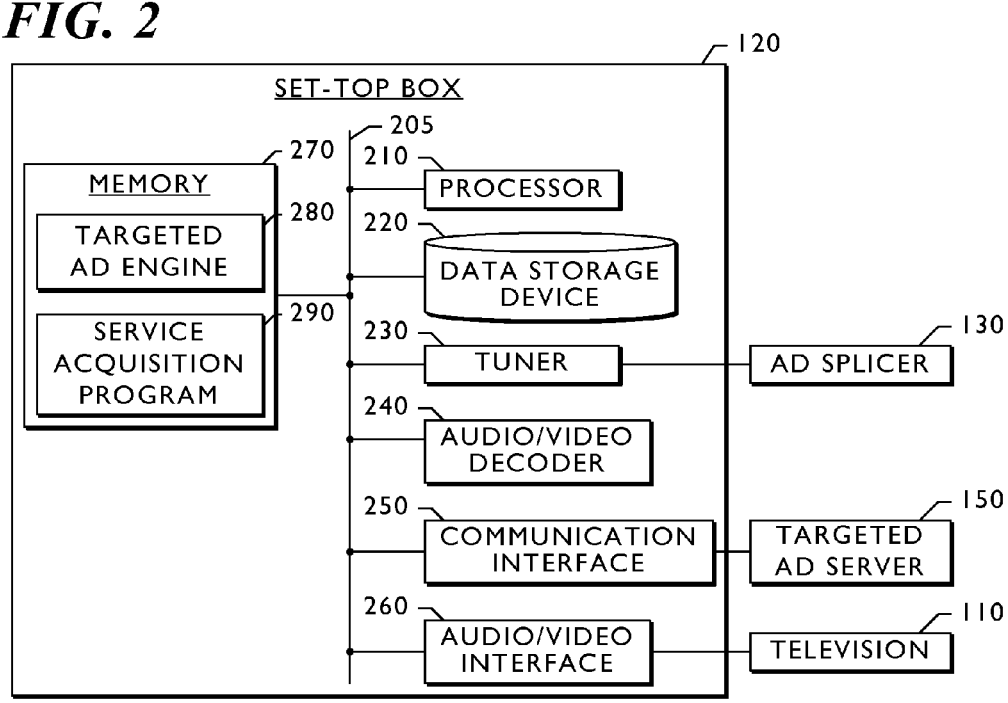
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the set-top box 120 shown in FIG. 1.

The set-top box 120, in one embodiment, is a general-purpose computing device that performs the present invention. A bus 205 is a communication medium that connects a processor 210, data storage device 220 (such as a Serial ATA (SATA) hard disk drive, optical drive, Small Computer System Interface (SCSI) disk, flash memory, storage located remotely in the internet cloud, network attached storage, or the like), tuner 230, audio/video decoder 240, communication interface 250, audio/video interface 260, and memory 270 (such as Random Access Memory (RAM), Dynamic RAM (DRAM), non-volatile computer memory, flash memory, or the like). The tuner 230 connects the set-top box 120 to the Ad splicer 130. The communication interface 250 connects the set-top box 120 to the targeted Ad server 130. The audio/video interface 260 connects the set-top box 120 to the television 110. In one embodiment, a user (not shown) operates a radio-frequency (RF) remote controller to communicate with the set-top box 120 via the television 110 and audio/video interface 260. In another embodiment, a keypad (not shown) is a user interface to the set-top box 120. In one embodiment, the implementation of the present invention on the set-top box 120 is an application-specific integrated circuit (ASIC).

The processor 210 performs the disclosed methods by executing the sequences of operational instructions that comprise each computer program resident in, or operative on, the memory 270. The reader should understand that the memory 270 may include operating system, administrative, and database programs that support the programs disclosed in this application. In one embodiment, the configuration of the memory 270 of the set-top box 120 includes a targeted advertisement (Ad) engine 280, and service acquisition program 290 that perform the methods of the present invention disclosed in detail in FIG. 4 and FIG. 5. When the processor 210 performs the disclosed methods, it stores intermediate results in the memory 270 or data storage device 220. In another embodiment, the memory 270 may swap programs, or portions thereof, in and out of the memory 270 as needed, and thus may include fewer than all of these programs at any one time.

Figure 3:
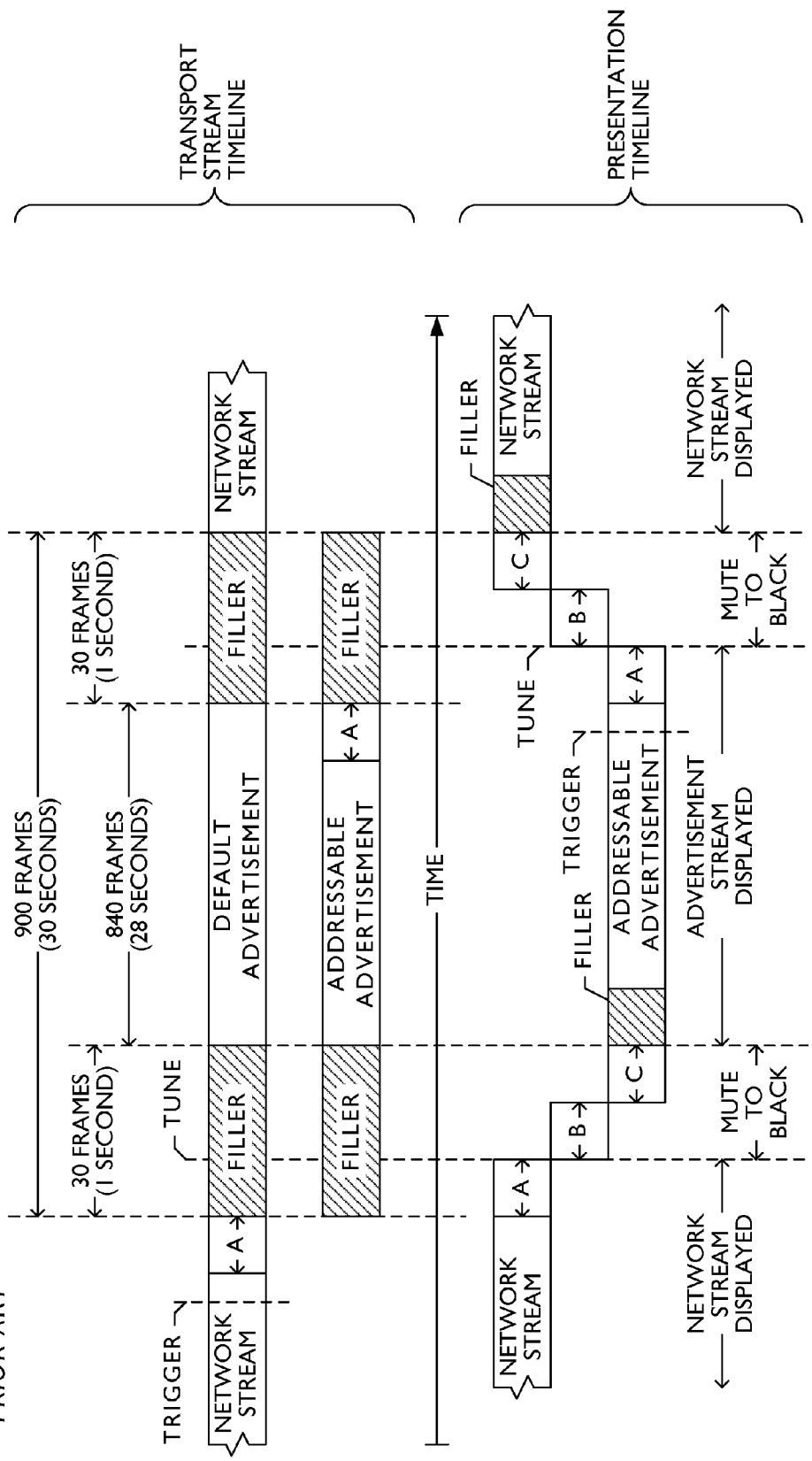
FIG. 3 is a schematic diagram that illustrates one embodiment of a prior art advertisement switch during a service acquisition process.

FIG. 3 is a schematic diagram that illustrates one embodiment of a prior art advertisement switch during a service acquisition process. FIG. 3 illustrates the service acquisition process as a timeline for the transport stream and a timeline for the presentation of the AV content.

The transport stream timeline shown in FIG. 3 includes two separate services, a network service and an addressable advertising service. The addressable advertising service includes an addressable advertisement that is synchronized with a network advertisement on the network service. The network service includes a trigger before the network advertisement. The trigger indicates an opportunity to switch from the network service to an addressable advertising service, to effect replacement of the network advertisement with an addressable advertisement. The trigger is aligned so that the network stream is not clipped as a result of a service acquisition. The network service and the addressable advertising service insert filler into the stream to account for the time necessary to complete the switch. The presentation timeline shown in FIG. 3 illustrates the presentation of the AV content when the network service switches to the addressable advertising service, thereby presenting the addressable advertisement to the viewer, rather than the network advertisement.

The portion of the presentation of the network stream denoted as "A" in FIG. 3 represents the time delay from when the last video frame is received to when it is actually presented. This length of this delay is based on the video buffering verifier (VBV) buffer size and the difference between the program clock reference (PCR) and presentation time stamp (PTS) times defined for the stream. A switch is initiated after the last video frame in the network stream is presented. As shown in FIG. 3, when the presentation of the last frame of the network stream is finished, frames of the filler that precedes the addressable advertisement have been missed. The same time delay, "A", is also accounted for when switching from the addressable advertising stream back to the network stream after the addressable advertisement is complete. The time delay denoted as "A" typically ranges from 200 ms to 1 second. The time delay is dependent on the encoding of the program. The length of the filler period should take into account the PCR and PTS difference in the stream.

The portion of the presentation of the network stream denoted as "B" in FIG. 3 represents the service acquisition time. The set-top box 120 tuner 230 initiates a switch to the addressable advertising service when it finishes presenting the last video frame received for the network service (i.e., time "A"). During the service acquisition time, the presentation of the AV content is disabled while the set-top box 120 tuner 230 acquires the new transport stream and service. In various embodiments, the disabling of the AV content is "mute to black", "mute to still", or the like. The final step of the service acquisition time is when the set-top box 120 AV decoder 240 is instructed to start searching for a sequence header in the new transport stream. Following the end of the portion of the service acquisition denoted as "B", the set-top box 120 AV interface 260 begins to receive, buffer, and decode the addressable advertising stream. The same time delay, "B", is also accounted for when switching from the addressable advertising stream back to the network stream after the addressable advertisement is complete.

The portion of the presentation of the network stream denoted as "C" in FIG. 3 represents the buffer, decode and presentation time delay. During this time delay, the service is being received from the transport stream, buffered, and decoded based on the parameters of the stream. A large difference between the PCR and PTS as seen in the portion of the presentation of the network stream denoted as "A" may have an impact on the time delay in the portion of the presentation of the network stream denoted as "C" where the first frame of the new service may be presented for a period of time before the remaining video frames are presented. The same time delay, "C", is also accounted for when switching from the addressable advertising stream back to the network stream after the addressable advertisement is complete.

Figure 4:
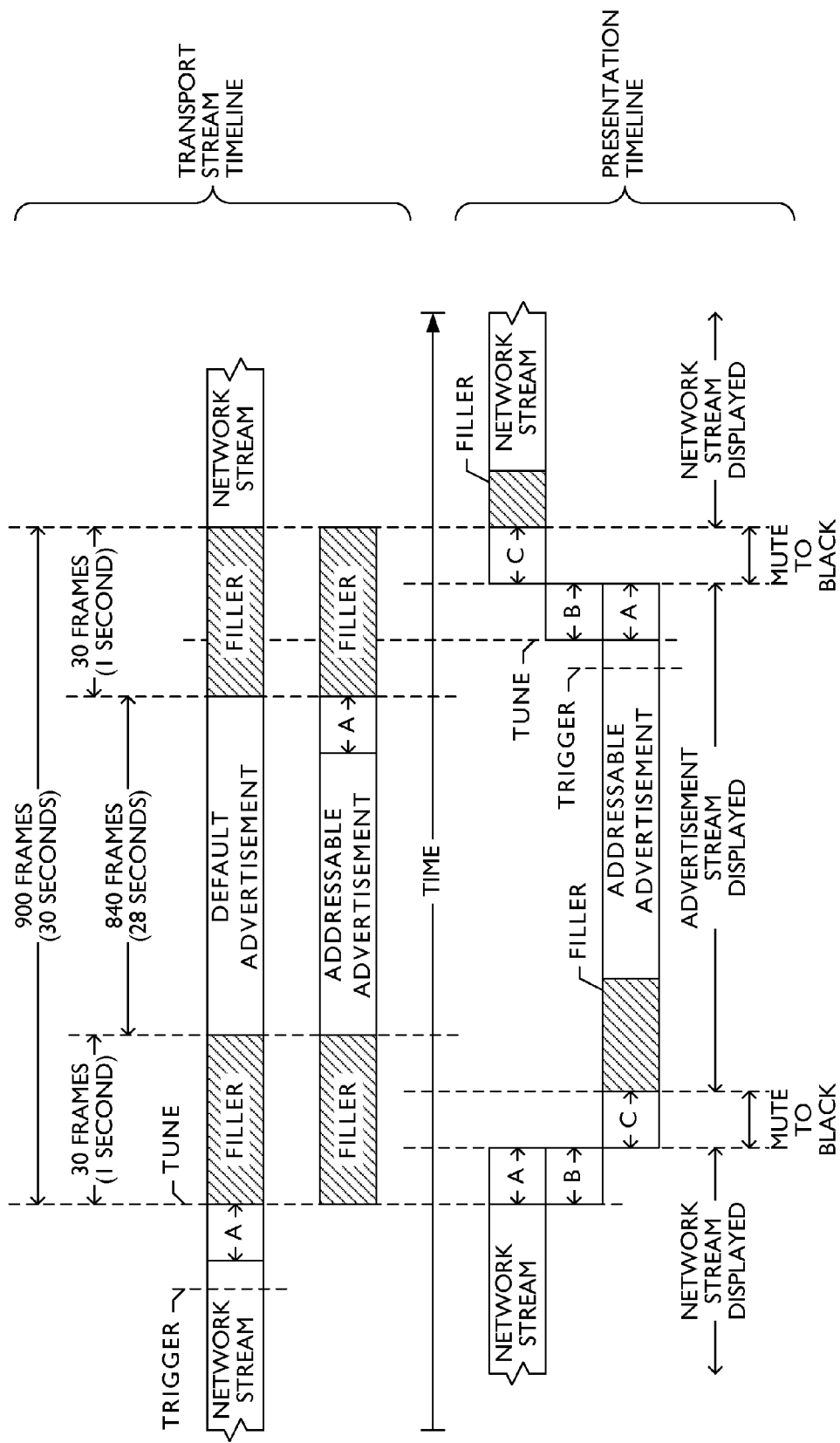
FIG. 4 is a schematic diagram that illustrates one embodiment of an advertisement switch during a service acquisition process according to one embodiment of the present invention.

FIG. 4 is a schematic diagram that illustrates one embodiment of an advertisement switch during a service acquisition process according to one embodiment of the present invention. FIG. 4 is similar to FIG. 3 in that it illustrates the service acquisition process as a timeline for the transport stream and a timeline for the presentation of the AV content.

The transport stream timeline shown in FIG. 4 includes two separate services, a network service and an addressable advertising service. The addressable advertising service includes an addressable advertisement that is synchronized with a network advertisement on the network service. The network service includes a trigger before the network advertisement. The trigger indicates an opportunity to switch from the network service to an addressable advertising service, to effect replacement of the network advertisement with an addressable advertisement. The trigger is aligned so that the network stream is not clipped as a result of a service acquisition. The network service and the addressable advertising service insert filler into the stream to account for the time necessary to complete the switch. The presentation timeline shown in FIG. 4 illustrates the presentation of the AV content when the network service switches to the addressable advertising service, thereby presenting the addressable advertisement to the viewer, rather than the network advertisement.

The tuning process shown in FIG. 4 includes two parts, Service Acquisition, and Decode and Presentation. As shown in FIG. 3, these two parts occur in series. FIG. 4 illustrates Simultaneous Service Acquisition and Decoder Buffer Presentation by decoupling the two parts so that as the network stream finishes playing out of the decoder buffer, the tuner 230 may be in the process of acquiring the addressable advertising transport stream and service. Essentially, the switch initiates early, but the mute to black is deferred until the remaining network video is played out of the buffer.

As shown in FIG. 4, during time denoted as "A" (i.e., the time delay from when the last video frame is received to when it is actually presented), the time denoted as "B" (i.e., the service acquisition time) is already in progress. Thus, the set-top box 120 tuner 230 initiates a switch to the addressable advertising service when it begins processing the last video frame received for the network service (i.e., time "A"). As shown in FIG. 4, as soon as the buffer is empty of network service video (i.e., time "A"), the addressable advertising stream is already acquired (i.e., time "B") and may start being buffered. Since the addressable advertising stream is being acquired while the last video frame of network content is played out, one advantage of the process shown in FIG. 4 is that there is no need for the presentation of the AV content to be muted to black while acquiring the new transport stream and service. Furthermore, the simultaneous service acquisition and decode buffer presentation will save an amount of time equal to the smaller of the two times, "A" and "B". The same time delays, "A" and "B", are also accounted for when switching from the addressable advertising stream back to the network stream after the addressable advertisement is complete.

The portion of the presentation of the network stream denoted as "C" in FIG. 4 represents the buffer, decode and presentation time delay. Similar to FIG. 3, during this time delay, the presentation of the AV content is disabled while the service is being received from the transport stream, buffered, and decoded based on the parameters of the stream. The same time delay, "C", is also accounted for when switching from the addressable advertising stream back to the network stream after the addressable advertisement is complete.

Figure 5:
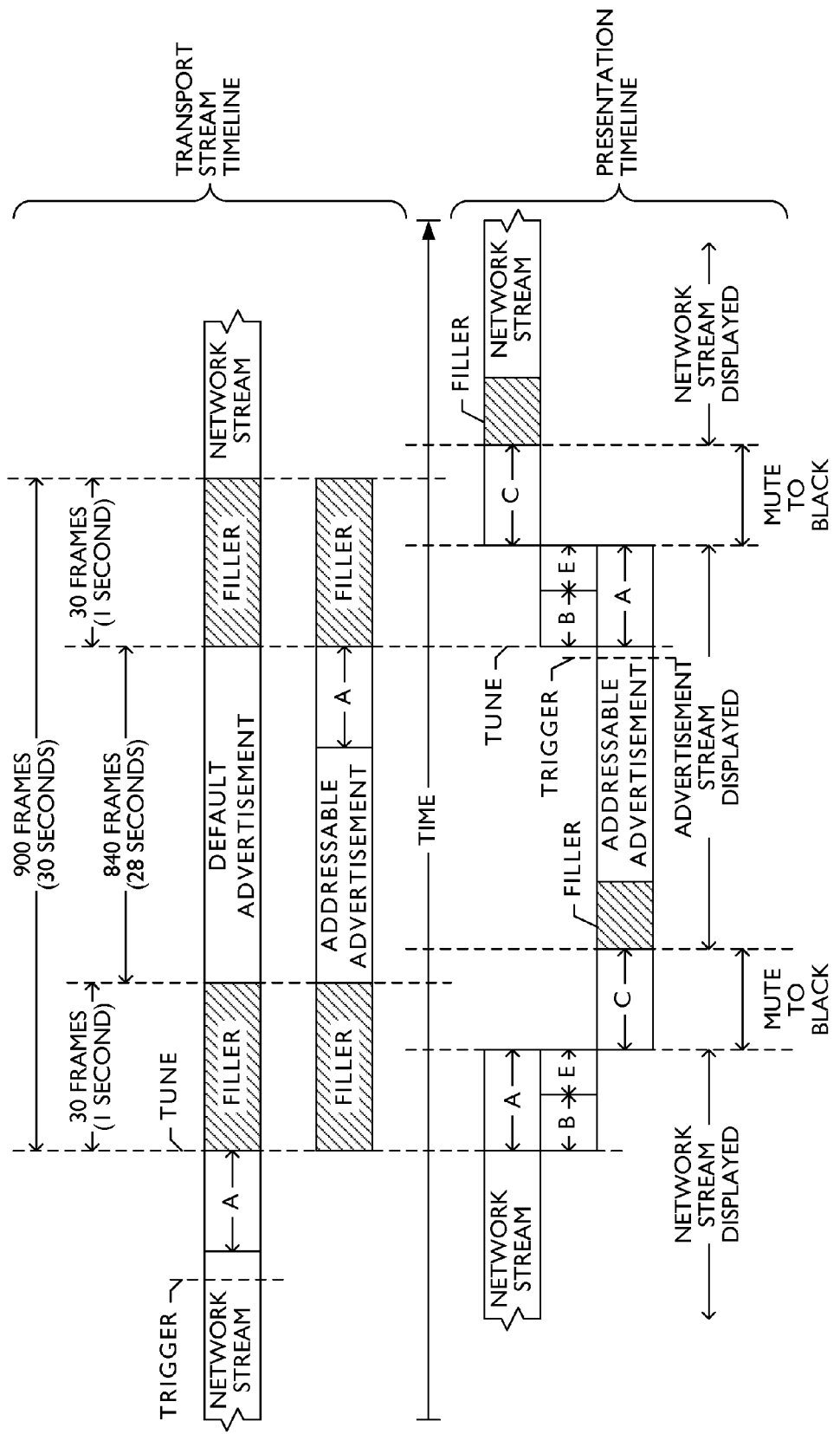
FIG. 5 is a schematic diagram that illustrates one embodiment of an advertisement switch during a service acquisition process according to one embodiment of the present invention.

FIG. 5 is a schematic diagram that illustrates one embodiment of an advertisement switch during a service acquisition process according to one embodiment of the present invention. FIG. 5 is similar to FIG. 4 in that it illustrates the service acquisition process as a timeline for the transport stream and a timeline for the presentation of the AV content.

FIG. 5 illustrates an example similar to that shown in FIG. 4, but with Simultaneous Service Acquisition and Decoder Buffer Presentation implemented for services with long differences between the PCR and PTS times. The set-top box 120 switch completes in time so that no advertisement or network content gets clipped. The portion of the presentation of the network stream denoted as "E" represents the time where the tuner 230 is ready and has received and processed a Program Allocation Table (PAT) and Program Map Table (PMT), but it is waiting for the buffer to be emptied of the network stream so it can begin using it. The time delay, "A", "B", and "E", are also accounted for when switching from the addressable advertising stream back to the network stream after the addressable advertisement is complete.

The portion of the presentation of the network stream denoted as "C" in FIG. 5 represents the buffer, decode and presentation time delay. Similar to FIG. 4, during this time delay, the presentation of the AV content is muted to black while the service is being received from the transport stream, buffered, and decoded based on the parameters of the stream. The same time delay, "C", is also accounted for when switching from the addressable advertising stream back to the network stream after the addressable advertisement is complete.

In another embodiment, the Switch Command implements the Simultaneous Service Acquisition and Decoder Buffer Presentation function. There are two alternative methods to trigger the switch. The first method is to use a buffer underrun flag indicator from the Decoder Hardware as the queue to implement the service acquisition on the ad stream, but this necessitates Decoder Hardware that provides a buffer underrun notification. The second method is to set a timer based on the difference between the PCR and PTS delay of the last frame of video of the network stream.

Leveraging the Simultaneous Service Acquisition and Decoder Buffer Presentation shown in FIG. 4 and FIG. 5, in another embodiment, the network service and the addressable advertising service share a buffer, rather than needing to reset the decoder and associated buffers before each switch/service acquisition. This will allow the new stream to start buffering while the old stream is still playing out of the buffer. Thus, as shown in FIG. 5, if the portion of the presentation of the network stream denoted as "E" was not necessary, the portion of the presentation of the network stream denoted as "C" could start immediately upon completion of the portion of the presentation of the network stream denoted as "B". This would save substantial time in streams where there is a large buffer. This may impose additional restriction on the stream composition, however, to ensure that the decoder can seamlessly go from one stream to another. In another embodiment, the process marks the switch from one stream to another and resets and reconfigures the decoder at the switch point.

Figure 6:
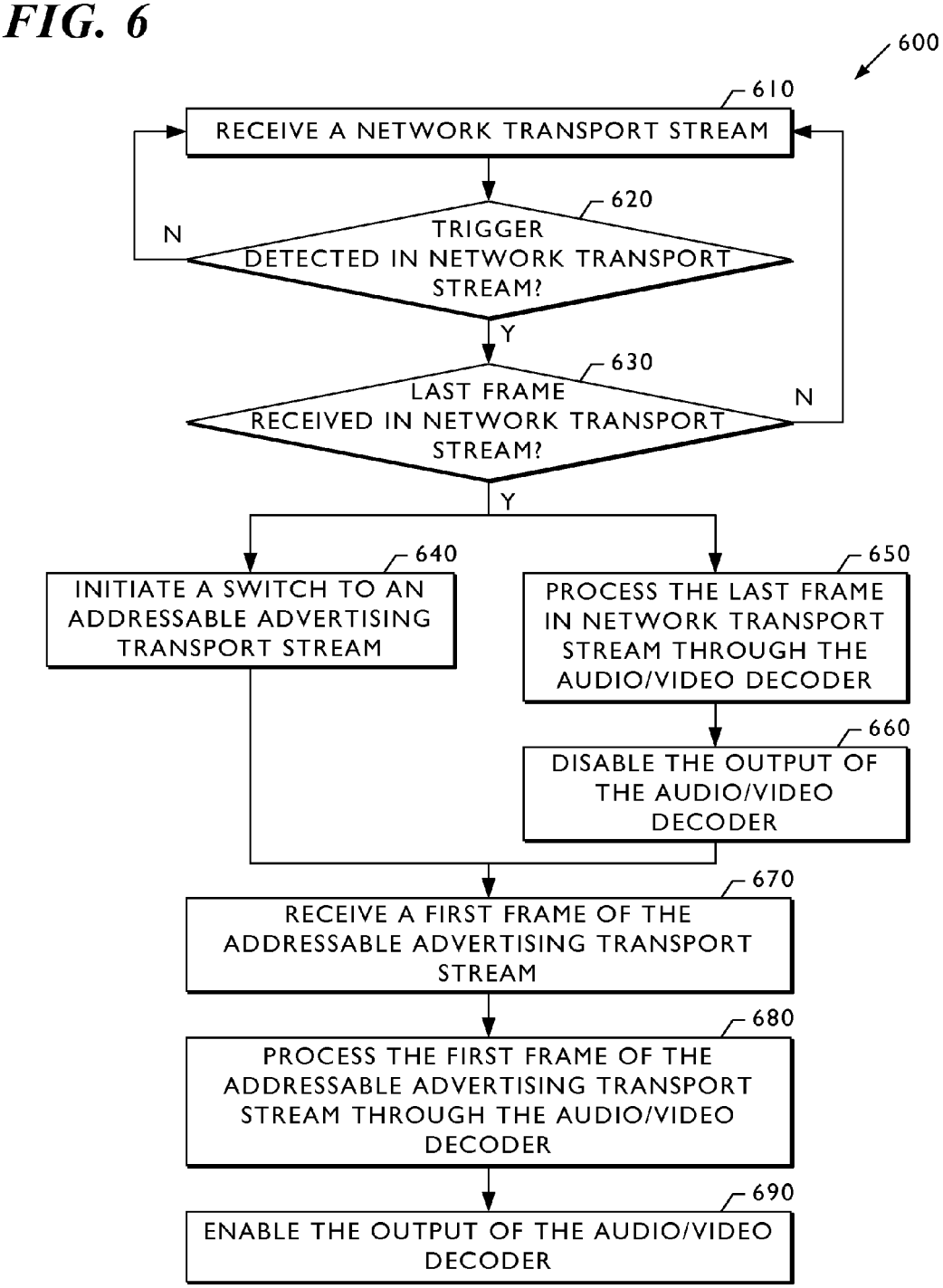
FIG. 6 is a flow diagram that illustrates a method according to one embodiment of the present invention.

FIG. 6 is a flow diagram that illustrates a method according to one embodiment of the present invention. In particular, FIG. 6 illustrates the set-top box 120 switching from a network transport stream to an addressable advertising transport stream.

The process 600 shown in FIG. 6, with reference to FIG. 1 and FIG. 2, begins when the set-top box 120 receives a network transport stream (step 610). The set-top box 120 monitors the network transport stream to detect a trigger (step 620). The trigger identifies a location in the network transport stream that is a switch point for tuning to an addressable advertising transport stream. If the set-top box 120 detects the trigger (step 620, Y branch), it determines whether the last frame of audio/video content that precedes the switch point in the network transport stream has been received (step 630). If the last frame has been received (step 630, Y branch), the set-top box 120 simultaneously initiates a switch to an addressable advertising transport stream (step 640), and processes the last frame in the network transport stream through the audio/video decoder 240 (step 650). In one embodiment, the set-top box 120 initiates the switch by moving an inband tuner 230 to the addressable advertising transport stream and acquiring the addressable advertising transport stream. When the set-top box 120 finishes processing the last frame in the network transport stream through the audio/video decoder 240 (step 650), it disables (i.e., mute to black, or mute to still) the output of the audio/video decoder 240 (step 660). The set-top box 120 receives the first frame of the addressable advertising transport stream (step 670), processes the first frame of the addressable advertising transport stream through the audio/video decoder 240 (step 680), and after the processing of the first frame, enables the output of the audio/video decoder 240 (step 690).

Although the disclosed embodiments describe a fully functioning method and computing device for switching from a network transport stream to an addressable advertising transport stream, the reader should understand that other equivalent embodiments exist. Since numerous modifications and variations will occur to those reviewing this disclosure, the method and system for switching from a network transport stream to an addressable advertising transport stream is not limited to the exact construction and operation illustrated and disclosed. Accordingly, this disclosure intends all suitable modifications and equivalents to fall within the scope of the claims.

We claim:

1. A method, comprising:
   detecting a trigger in a first transport stream, wherein the trigger determines a location in the first transport stream that is a switch point for tuning from the first transport stream to a second transport stream;
   receiving a last frame of audio/video content in the first transport stream, the last frame immediately preceding the switch point;
   after the receiving of the last frame, initiating a switch to the second transport stream by:
      moving an inband tuner from receiving the first transport stream to receiving the second transport stream; and
      acquiring the second transport stream;
   processing the last frame through an audio/video decoder simultaneous with the initiating of the switch to the second transport stream;
   outputting the last frame from the audio/video decoder;
   after the processing of the last frame and the outputting of the last frame, disabling output of the audio/video decoder;
   after the initiating of the switch to the second transport stream, receiving a first frame of audio/video content in the second transport stream;
   after the disabling of the output of the audio/video decoder, processing the first frame through the audio/video decoder; and
   after the processing of the first frame, enabling the output of the audio/video decoder and outputting the first frame.

2. The method of claim 1, wherein the first transport stream includes MPEG audio/video content for a first service, and wherein the second transport stream includes MPEG audio/video content for a second service.

3. The method of claim 1, wherein the receiving of the last frame in the first transport stream further comprises:
   storing the last frame in a buffer.

4. The method of claim 1, wherein the processing of the last frame in the first transport stream further comprises:
   converting the last frame to a decoded last frame.

5. The method of claim 1, wherein the processing of the last frame in the first transport stream simultaneous with the initiating of the switch minimizes a time for switching from the first stream to the second stream.

6. The method of claim 1, wherein the disabling of the output of the audio/video decoder is at least one of "mute to black", and "mute to still".

7. The method of claim 1, wherein the receiving of the first frame in the second transport stream further comprises:
   storing the first frame in a buffer.

8. The method of claim 1, wherein the processing of the first frame in the second transport stream further comprises:
   converting the first frame to a decoded first frame.

9. The method of claim 1, wherein the first transport stream and the second transport stream utilize a shared buffer, wherein the receiving of the last frame stores the last frame in the shared buffer, and wherein the receiving of the first frame stores the first frame in the shared buffer.

10. A computing device, comprising:
    a memory device resident in the computing device; and
    a processor disposed in communication with the memory device, the processor configured to:
       detect a trigger in a first transport stream, wherein the trigger determines a location in the first transport stream that is a switch point for tuning from the first transport stream to a second transport stream;
       receive a last frame of audio/video content in the first transport stream, the last frame immediately preceding the switch point;
       after the receiving of the last frame, initiate a switch to the second transport stream by:
          moving an inband tuner from receiving the first transport stream to receiving the second transport stream; and
          acquiring the second transport stream;
       process the last frame through an audio/video decoder simultaneous with the initiating of the switch the second stream;
       output the last frame from the audio/video decoder;
       after the processing of the last frame and the outputting of the last frame, disable output of the audio/video decoder;
       after the initiating of the switch to the second transport stream, receive a first frame of audio/video content in the second transport stream;
       after the disabling of the output of the audio/video decoder, process the first frame through the audio/video decoder; and
       after the processing of the first frame, enabling the output of the audio/video decoder and outputting the first frame.

11. The computing device of claim 10, wherein the first transport stream includes MPEG audio/video content for a first service, and wherein the second transport stream includes MPEG audio/video content for a second service.

12. The computing device of claim 10, wherein to receive the last frame in the first transport stream, the processor is further configured to:
    store the last frame in a buffer.

13. The computing device of claim 10, wherein to process the last frame in the first transport stream, the processor is further configured to:
  convert the last frame to a decoded last frame.

14. The computing device of claim 10, wherein the processing of the last frame in the first transport stream simultaneous with the initiating of the switch minimizes a time for switching from the first stream to the second stream.

15. The computing device of claim 10, wherein the disabling of the output of the audio/video decoder is at least one of "mute to black", and "mute to still".

16. The computing device of claim 10, Wherein to receive the first frame in the second transport stream, the processor is further configured to:
  store the first frame in a buffer.

17. The computing device of claim 10, wherein to process the first frame in the second transport stream, the processor is further configured to:
  convert the first frame to a decoded first frame.

18. The computing device of claim 10, wherein the first transport stream and the second transport stream utilize a shared buffer, wherein the receiving of the last frame stores the last frame in the shared buffer, and wherein the receiving of the first frame stores the first frame in the shared buffer.

19. A non-transitory computer-readable medium, comprising computer-executable instructions that, when executed on a computing device, perform steps of:
  detecting a trigger in a first transport stream, wherein the trigger determines a location in the first transport stream that is a switch point for tuning from the first transport stream to a second transport stream;
  receiving, a last frame of audio/video content in the first transport stream, the last frame immediately preceding the switch point;
  after the receiving of the last frame, initiating a switch to the second transport stream by:
    moving an inband tuner from receiving the first transport stream to receiving the second transport stream; and
    acquiring the second transport stream;
  processing the last frame through an audio/video decoder simultaneous with the initiating of the switch to the second transport stream;
  outputting the last frame from the audio/video decoder;
  after the processing of the last frame and the outputting of the last frame, disabling output of the audio/video decoder;
  after the initiating of the switch to the second transport stream, receiving a first frame of audio/video content in the second transport stream;
  after the disabling of the output of the audio/video decoder, processing the first frame through the audio/video decoder; and
  after the processing of the first frame, enabling the output of the audio/video decoder and outputting the first frame.

\* \* \* \* \*